United States Patent
Jung et al.

(10) Patent No.: US 11,693,518 B2
(45) Date of Patent: Jul. 4, 2023

(54) TOUCH DRIVER CIRCUIT AND DRIVING METHOD, AND DRIVER APPARATUS OF TOUCH DISPLAY DEVICE

(71) Applicant: LX SEMICON CO., LTD., Daejeon (KR)

(72) Inventors: Hee Yoon Jung, Daejeon (KR); Hyung Sub Kim, Daejeon (KR); Jung Hyun Tark, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/864,575

(22) Filed: Jul. 14, 2022

(65) Prior Publication Data

US 2023/0134476 A1 May 4, 2023

(30) Foreign Application Priority Data

Oct. 29, 2021 (KR) .......................... 10-2021-0146637

(51) Int. Cl.
*G06F 3/041* (2006.01)
*G09G 3/36* (2006.01)

(52) U.S. Cl.
CPC ...... *G06F 3/04184* (2019.05); *G06F 3/04164* (2019.05); *G09G 3/3655* (2013.01)

(58) Field of Classification Search
CPC ............ G06F 3/04184; G06F 3/04164; G09G 3/3655; G09G 2320/0673
See application file for complete search history.

(56) References Cited

U.S. PATENT DOCUMENTS

| | | | | |
|---|---|---|---|---|
| 9,703,425 B2* | 7/2017 | Lee | ....................... | G06F 3/0412 |
| 9,727,163 B2* | 8/2017 | Mizuhashi | ............ | G06F 3/0446 |
| 10,152,157 B2* | 12/2018 | Cho | ..................... | G09G 3/3685 |
| 10,222,885 B2* | 3/2019 | Lee | ....................... | G06F 3/0412 |
| 10,444,881 B2* | 10/2019 | Jang | ................... | G06F 3/04184 |
| 10,528,183 B2* | 1/2020 | Kim | ..................... | G09G 3/3611 |
| 10,698,515 B2* | 6/2020 | Cho | ................... | G06F 3/04166 |
| 10,866,672 B2* | 12/2020 | Seo | ......................... | G09G 3/20 |
| 11,086,449 B2* | 8/2021 | Jang | ................... | G06F 3/04166 |

(Continued)

FOREIGN PATENT DOCUMENTS

| | | |
|---|---|---|
| KR | 10-2017-0043983 A | 4/2017 |
| KR | 10-2020-0081185 A | 7/2020 |

*Primary Examiner* — Michael J Jansen, II
(74) *Attorney, Agent, or Firm* — Rothwell, Figg, Ernst & Manbeck, P.C.

(57) ABSTRACT

The present disclosure relates to a touch driver circuit capable of reducing the distortion of a common voltage modulation signal caused by line resistance. The touch driver circuit may include a touch power integrated circuit configured to generate a reference gamma voltage set to output the reference gamma voltage set through a gamma transmission path during a display period, and generate a touch driving voltage to output the touch driving voltage through the gamma transmission path during a touch period, and a source-readout integrated circuit configured to drive a source driving circuit block using the reference gamma voltage set during the display period, and generate a common voltage modulation signal using the touch driving voltage to drive a readout circuit block using the generated common voltage modulation signal during the touch period.

20 Claims, 11 Drawing Sheets

(56) References Cited

U.S. PATENT DOCUMENTS

| | | | |
|---|---|---|---|
| 2013/0162595 A1* | 6/2013 | Lee | G06F 3/0418 |
| | | | 345/174 |
| 2014/0253536 A1* | 9/2014 | Honda | G06F 3/0412 |
| | | | 345/87 |
| 2015/0185941 A1* | 7/2015 | Lee | G06F 3/0412 |
| | | | 345/173 |
| 2015/0205433 A1* | 7/2015 | Mizuhashi | G06F 3/04184 |
| | | | 345/174 |
| 2018/0059832 A1* | 3/2018 | Cho | G06F 3/0443 |
| 2018/0188865 A1* | 7/2018 | Jang | H03F 3/45179 |
| 2019/0073075 A1* | 3/2019 | Cho | G06F 3/0443 |
| 2019/0129564 A1* | 5/2019 | Kim | G06F 3/04166 |
| 2020/0097112 A1* | 3/2020 | Seo | G06F 3/044 |
| 2021/0004103 A1* | 1/2021 | Jang | G06F 3/04184 |

* cited by examiner

TOUCH DRIVER CIRCUIT AND DRIVING METHOD, AND DRIVER APPARATUS OF TOUCH DISPLAY DEVICE

CROSS-REFERENCE TO RELATED APPLICATION

This application claims the benefit of the Korean Patent Application No. 10-2021-0146637 filed on Oct. 29, 2021, which are hereby incorporated by reference as if fully set forth herein.

FIELD OF THE INVENTION

The present disclosure relates to a touch driver circuit capable of reducing signal distortion caused by line resistance, a method of driving the same, and a driver apparatus of a touch display device.

BACKGROUND

Touch sensors allowing information to be input by touch on a screen of a display are being widely applied to various displays such as laptop computers, monitors, home appliances, and the like as well as portable information devices such as smart phones.

An add-on type in which a touch panel is attached to a display panel and an in-cell type in which a touch electrode is embedded in a display panel are known as touch sensors applied to the display.

The in-cell touch display device may use common electrodes of a liquid crystal display (LCD) panel as touch electrodes by time-divisionally driving the common electrodes. The in-cell touch display device may time-divisionally drive the LCD panel in a display period and a touch period.

In the in-cell touch display device, a source-readout integrated circuit (SRIC) may receive a common voltage modulation signal from a touch power integrated circuit (TPIC) during the touch period and use the common voltage modulation signal as a touch driving signal.

As the common voltage modulation signal generated in the TPIC is supplied to the SRIC via a printed circuit board (PCB), signal distortion may occur due to line resistance. The distortion of the common voltage modulation signal used as the touch driving signal may degrade touch sensing performance.

A method for reducing the manufacturing costs of the in-cell touch display device is required.

SUMMARY

The present disclosure is directed to providing a touch driver circuit capable of reducing distortion of a common voltage modulation signal caused by line resistance, a method of driving the same, and a driver apparatus of a touch display device.

The present disclosure is also directed to providing a touch driver circuit capable of reducing manufacturing costs by reducing the number of pads of an integrated circuit and the number of lines of a printed circuit board, a method of driving the same, and a driver apparatus of a touch display device.

According to an aspect of the present disclosure, there is provided a touch driver circuit including an active gamma voltage generation block configured to generate a reference gamma voltage set to output the reference gamma voltage set through a gamma transmission path during a display period, and generate a touch driving voltage to output the touch driving voltage through the gamma transmission path during a touch period, a switching block configured to output the reference gamma voltage set supplied through the gamma transmission path to a first path during the display period and output the touch driving voltage supplied through the gamma transmission path to a second path during the touch period, and a common voltage modulation block configured to generate and output a common voltage modulation signal using the touch driving voltage supplied through the switching block and the second path during the touch period.

According to another aspect of the present disclosure, there is provided a method of driving a touch driver circuit, the method including generating a reference gamma voltage set and outputting the reference gamma voltage set through a gamma transmission path by an active gamma voltage generation block of a touch power integrated circuit during a display period of a touch synchronization signal, generating a data voltage using the reference gamma voltage set and outputting the data voltage to a data line by a source-readout integrated circuit during the display period of the touch synchronization signal, generating a touch driving voltage and outputting the touch driving voltage through the gamma transmission path by the active gamma voltage generation block of the touch power integrated circuit during a touch period of the touch synchronization signal, and generating a common voltage modulation signal using the touch driving voltage and outputting the generated common voltage modulation signal to a touch routing line by the source-readout integrated circuit during the touch period of the touch synchronization signal.

According to still another aspect of the present disclosure, there is provided a driver apparatus of a touch display device, the driver apparatus including a touch power integrated circuit configured to generate a reference gamma voltage set to output the reference gamma voltage set through a gamma transmission path during a display period of a touch synchronization signal, and generate a touch driving voltage to output the touch driving voltage through the gamma transmission path during a touch period of the touch synchronization signal; and a source-readout integrated circuit configured to output a data voltage using the reference gamma voltage set during the display period, and generate a common voltage modulation signal using the touch driving voltage to output the generated common voltage modulation signal during the touch period.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Hereinafter, each embodiment of the present disclosure will be described in detail with reference to the drawings.

Figure 1:
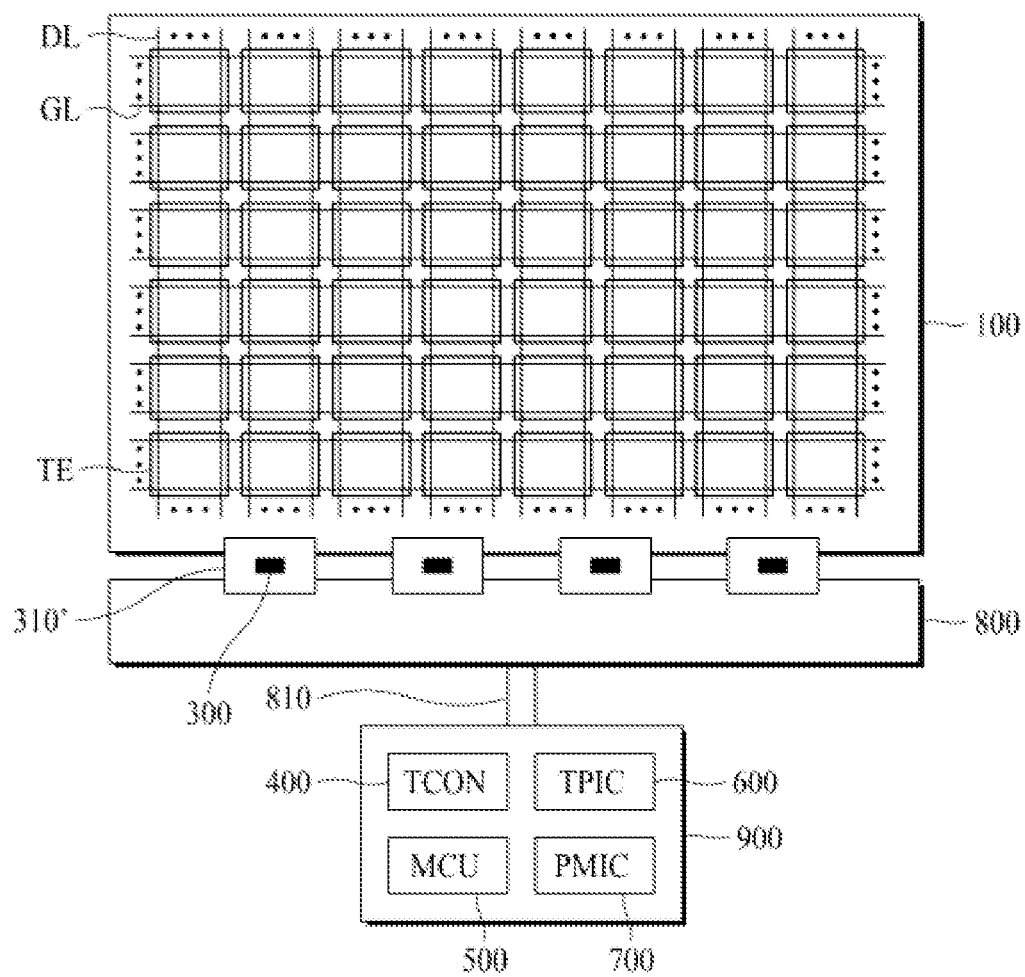
FIG. 1 is a block diagram illustrating a configuration of a touch display device according to one embodiment.
Figure 2:
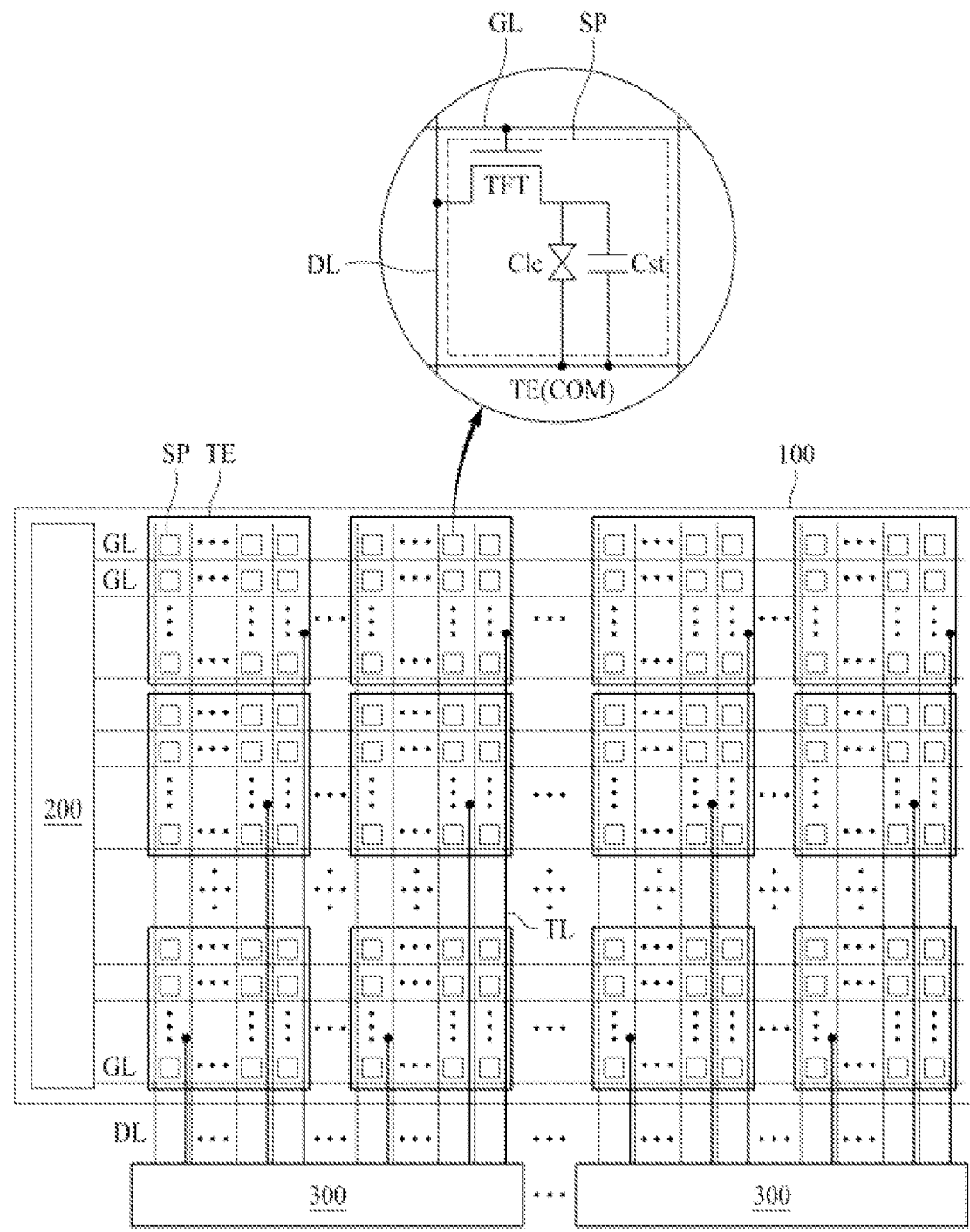
FIG. 2 is a diagram illustrating a configuration of a touch electrode and a sub-pixel in a panel according to one embodiment.
Figure 3:
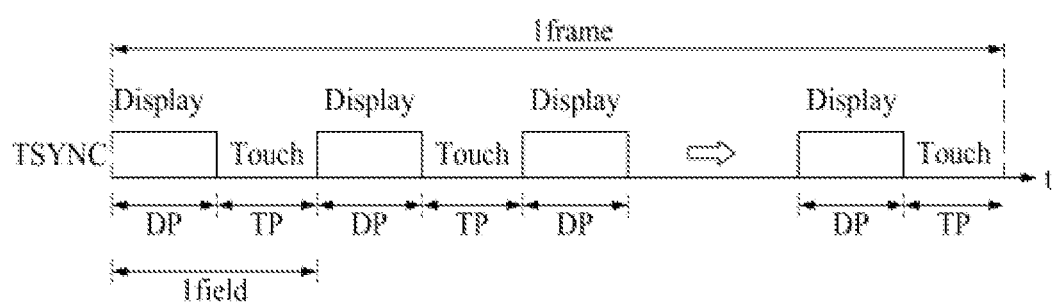
FIG. 3 is a diagram illustrating a time-division driving method of one frame of the touch display device according to one embodiment.
Figure 4:
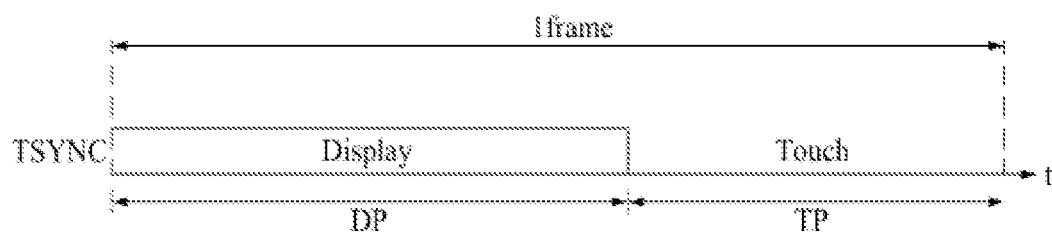
FIG. 4 is a timing diagram illustrating the time-division driving method of one frame of the touch display device according to one embodiment.
Figure 5:
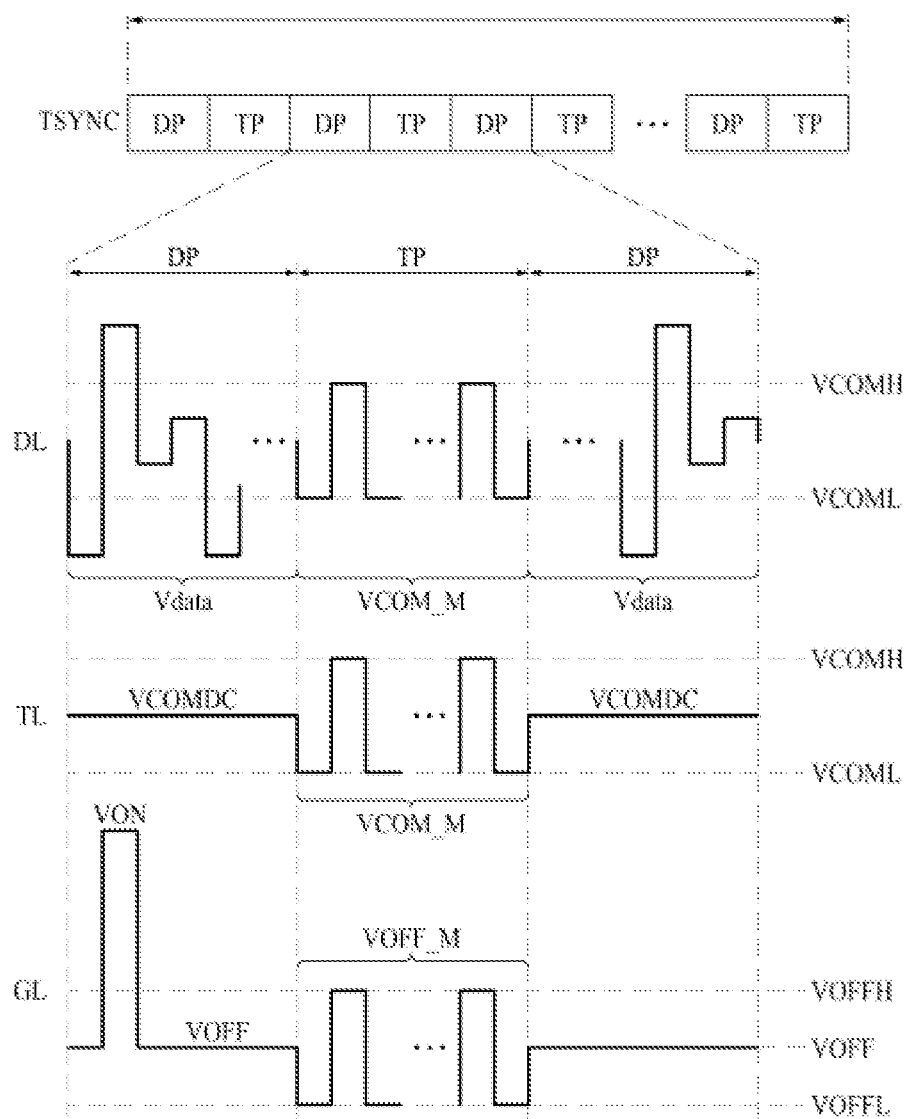
FIG. 5 is a driving waveform diagram of the touch display device according to one embodiment.

FIG. 1 is a block diagram schematically illustrating a configuration of a touch display device according to one embodiment, and FIG. 2 is a diagram illustrating a configuration of a touch electrode and a sub-pixel in a panel according to one embodiment. FIGS. 3 and 4 are diagrams illustrating a time-division driving method of one frame of the touch display device according to one embodiment, and FIG. 5 is a driving waveform diagram of the touch display device according to one embodiment.

Referring to FIGS. 1 and 2, the touch display device may include a panel 100, a gate driver 200, a source-readout integrated circuit (hereinafter, referred to as an SRIC) 300, a timing controller (hereinafter, referred to as a TCON) 400, and a microcontroller unit (hereinafter, referred to as an MCU) 500, a touch power integrated circuit (hereinafter, referred to as a TPIC) 600, a power management integrated circuit (hereinafter, referred to as a PMIC) 700, and the like. The touch display device further includes a backlight unit (not shown) configured to emit light to the panel 100 and a backlight driver (not shown) configured to drive the backlight unit.

The panel 100 may have a touch sensing function and a display function. The panel 100 displays an image through a display area in which sub-pixels SP are arranged in the form of a matrix. The panel 100 may use touch electrodes TE, which also serve as common electrodes, included in a pixel matrix of the display area to readout whether a user's touch has been made by using a capacitance touch sensing method. Any one of a mutual-capacitance touch sensing method and a self-capacitance touch sensing method may be used as the capacitance touch sensing method, and in the embodiments of the present disclosure, a description is made taking the self-capacitance touch sensing method as an example.

Each of the sub-pixels SP may be any one of a red sub-pixel emitting red light, a green sub-pixel emitting green light, a blue sub-pixel emitting blue light, and a white sub-pixel emitting white light, and may be independently driven by each thin-film transistor (TFT). A unit pixel may be configured by a combination of two, three, or four sub-pixels with different colors.

A gate electrode of the TFT belonging to each sub-pixel SP is connected to the gate driver 200 through a gate line GL disposed on the panel 100, and any one of a source electrode and a drain electrode of each TFT is connected to the SRIC 300 through a data line DL disposed on the panel 100.

For example, as shown in FIG. 2, each sub-pixel SP may include a thin-film transistor TFT connected to the gate line GL and the data line DL, and a liquid crystal capacitor Clc and a storage capacitor Cst connected to a touch electrode TE, which is a common electrode COM, and the thin-film transistor TFT. A difference voltage between a data signal, which is supplied to a pixel electrode through the thin-film transistor TFT, and a common voltage VCOMDC, which is supplied to the touch electrode TE, is charged in the liquid crystal capacitor Clc, and the liquid crystal is driven according to the charged voltage, thereby adjusting light transmittance. The storage capacitor Cst stably maintains the voltage charged in the liquid crystal capacitor Clc.

The panel 100 includes a touch electrode matrix composed of the touch electrodes TE having a common electrode function of the pixel matrix and a touch sensor function. As shown in FIG. 2, the touch electrode matrix includes a plurality of touch electrode columns, and each of the touch electrode columns may include a plurality of touch electrodes TE arranged in a direction of the data line DL, and a plurality of touch routing lines TL configured to individually connect each of the plurality of touch electrodes TE to the SRIC 300. The plurality of touch electrodes TE are obtained by dividing the common electrodes located in the pixel matrix into a plurality of segments, and each of the touch electrodes TE may be formed in a specific size including a plurality of sub-pixels SP in consideration of a size of a touch point. Each of the touch electrodes TE may serve as a common electrode commonly connected to the plurality of sub-pixels SP overlapping therewith, and may also serve as a respective touch sensor that forms a capacitor upon a user's touch.

The TCON 400 may receive image data and synchronization signals from a host system (not shown). For example, the host system may be any one of a computer, a TV system, a set-top box, and a system of a portable terminal such as a tablet or mobile phone. The synchronization signals may include a dot clock, a data enable signal, a vertical synchronization signal, a horizontal synchronization signal, and the like.

The TCON 400 may receive a touch synchronization signal TSYNC generated by the MCU 500, or generate the touch synchronization signal TSYNC to supply the touch synchronization signal TSYNC to the MCU 500.

As shown in FIGS. 3 and 5, the touch synchronization signal TSYNC may be time-divisionally driven in a plurality of display periods DP and a plurality of touch periods TP such that each display period DP and each touch period TP alternate in each frame, or as shown in FIG. 4, the touch synchronization signal TSYNC may be used as a control signal for time-divisionally driving each frame in the display period DP and the touch period TP. In FIGS. 3 and 5, one display period DP and one touch period TP may be defined as one field period. In each frame, the pixel matrix is scanned once in the plurality of display periods DP, while the touch electrode matrix may be driven and sensed twice or more in the plurality of touch periods TP.

Each display period DP, which is distinguished by the touch synchronization signal TSYNC shown in FIGS. 3 to 5, refers to a period during which the image data is charged (written) to the sub-pixels of a corresponding pixel block in the panel 100 through the gate driver 200 and the SRIC 300. Each touch period TP refers to a period during which a touch driving signal VCOM_M is applied to the touch electrodes TE of a corresponding touch block in the panel 100 through the SRIC 300, and a capacitance change is read out from the touch electrodes TE to which the touch driving signal VCOM_M is applied.

The TCON 400 may generate data control signals for controlling an operation timing of the SRIC 300 using the input synchronization signals and touch synchronization signal TSYNC and timing setting information stored in a register, and supply the data control signals to the SRIC 300. For example, the data control signals may include a source start pulse and a source sampling clock used to control a latch timing of data, a source output enable signal for controlling an output timing of the data, a polarity control signal for controlling a polarity of the data signal, and the like.

The TCON 400 may generate gate control signals for controlling an operation timing of the gate driver 200 using the input synchronization signals and touch synchronization signal TSYNC and the timing setting information stored in the register, and supply the gate control signals to the gate driver 200. For example, the gate control signals may include a gate start pulse, a gate shift clock, and the like used for an operation of a shift register of the gate driver 200.

Meanwhile, the TCON 400 may generate timing control signals, such as a start pulse, an on-clock, an off-clock, and the like required for generating the gate control signals, and supply the timing control signals to a level shifter embedded in the PMIC 700.

The TCON 400 may store image data supplied from the system in a memory. The TCON 400 may perform various types of image processing for image quality compensation, power consumption reduction, and the like on the image data and store the image data in the memory. In each display period DP, the TCON 400 may read the image data of the corresponding pixel block from the memory at a reading speed faster than a writing speed, and supply the image data and the data control signals to the SRIC 300.

The MCU 500 may generate the touch synchronization signal TSYNC or may receive the touch synchronization signal TSYNC from the TCON 400. The MCU 500 may generate various touch control signals including a pulse width modulation (PWM) signal required for touch driving and sensing by using the touch synchronization signal TSYNC. The MCU 500 may supply the touch synchronization signal TSYNC and the touch control signals including the PWM signal to the TPIC 600, the SRIC 300, and the like.

The MCU 500 may receive touch sensing data from the SRIC 300, generate touch coordinates of a touch node at which a touch occurs, and supply the touch coordinates to the host system.

The PMIC 700 may receive an input voltage, and generate and supply a plurality of driving voltages required by the touch display device. The PMIC 700 may generate and supply various driving voltages required for the TPIC 600, the TCON 400, the MCU 500, the SRIC 300, the gate driver 200, and the like by using the input voltage.

Meanwhile, the PMIC 700 may include the level shifter embedded therein. The level shifter embedded in the PMIC 700 may receive basic timing signals including a start pulse, an on-clock, an off-clock, and the like from the TCON 400, generate a plurality of gate control signals, and supply the gate control signals to the gate driver 200. For example, the PMIC 700 may generate a plurality of gate shift clocks each having different rising timing and falling timing, which are respectively synchronized with the on-clock and the off-clock supplied from the TCON 400, and output the plurality of gate shift clocks to the gate driver 200, and may level-shift the start pulse, a reset pulse, and the like supplied from the TCON 400 and output the start pulse, the reset pulse, and the like to the gate driver 200.

The TPIC 600 may receive the output voltage of the PMIC 700 and the touch control signals of the MCU 500. The TPIC 600 may include a gate-off modulation block and an active gamma voltage generation block.

In response to the touch synchronization signal TSYNC, the TPIC 600 may output a gate-off voltage VOFF to the gate driver 200 during the display period DP, and the TPIC 600 may generate a gate-off modulation signal VOFF_M and output the gate-off modulation signal VOFF_M to the gate driver 200 during the touch period TP.

The TPIC 600 may select the gate-off voltage VOFF, which is supplied from the PMIC 700, and output the selected gate-off voltage VOFF to the gate driver 200 during the display period DP of the touch synchronization signal TSYNC.

The TPIC 600 may level-shift the PWM signal, which is supplied from the MCU 500, and generate the gate-off modulation signal VOFF_M of an AC waveform alternating between a gate-off high voltage VOFFH and a gate-off low voltage VOFFL during the touch period TP of the touch synchronization signal TSYNC. The TPIC 600 may select the gate-off modulation signal VOFF_M generated during the touch period TP of the touch synchronization signal TSYNC and output the selected gate-off modulation signal VOFF_M to the gate driver 200.

The TPIC 600 may generate a gate-off high voltage VOFFH higher than the gate-off voltage VOFF and a gate-off low voltage VOFFL lower than the gate-off voltage VOFF by converting a digital value stored in the internal memory into an analog voltage.

In response to the touch synchronization signal TSYNC, the TPIC 600 may be used as a gamma power source of a source driving block embedded in the SRIC 300 during the display period DP, and may be used as a power source of a common voltage modulation block embedded in the SRIC 300 during the touch period TP.

In other words, the TPIC 600 may generate reference gamma voltages and output the reference gamma voltages to the SRIC 300 during the display period DP of the touch synchronization signal TSYNC, and may generate a plurality of touch driving voltages VCOMH and VCOML and output the plurality of touch driving voltages VCOMH and VCOML to the SRIC 300 during the touch period TP.

The TPIC 600 may generate a reference gamma voltage set including a plurality of reference gamma voltages having different voltage levels and output the reference gamma voltage set to the SRIC 300 during the display period DP of the touch synchronization signal TSYNC.

The TPIC 600 may generate a plurality of touch driving voltages, i.e., a high common voltage VCOMH and a low common voltage VCOML and output the generated high common voltage VCOMH and low common voltage VCOML to the SRIC 300 during the touch period TP of the touch synchronization signal TSYNC. The TPIC 600 may output the plurality of touch driving voltages VCOMH and VCOML to the SRIC 300 by using an output buffer configured to generate and output the reference gamma voltages, and a pad and a transmission line through which the reference gamma voltages are output. Accordingly, in the TPIC 600 and the SRIC 300, the number of pads and the number of transmission lines through which the plurality of touch driving voltages VCOMH and VCOML are input and output may be reduced.

The TPIC 600 may generate the reference gamma voltage set by using the display operation voltage supplied from the PMIC 700. The TPIC 600 may generate a high common voltage VCOMH higher than the DC common voltage VCOMDC and a low common voltage VCOML lower than the DC common voltage VCOMDC by converting the digital value stored in the internal memory into the analog voltage.

The SRIC 300 may include a plurality of SRICs 300 that divisionally drive the data lines DL and the touch routing lines TL of the panel 100. The SRIC 300 may be defined as a touch-data driver. The SRIC 300 may include the source driving block configured to drive the data lines DL, a readout block configured to drive and read out the touch routing lines TL, and the common voltage modulation block configured to generate the common voltage modulation signal that is used as the touch driving signal.

The plurality of SRICs 300 may receive the image data and the data control signals from the TCON 400, receive the touch synchronization signal TSYNC from the TCON 400 or the MCU 500, receive the PWM signal from the MCU 500, and receive the reference gamma voltage set, the touch driving voltages VCOMH and VCOML, and the common voltage VCOMDC from the TPIC 600.

The plurality of SRICs 300 may convert the image data into an analog data signal and supply the analog data signal to the data lines DL of the panel 100 during the display period DP of the touch synchronization signal TSYNC. The plurality of SRICs 300 may generate a plurality of subdivided grayscale voltages using the reference gamma voltage set supplied from the TPIC 600, and may convert the digital image data into the analog data signal using the grayscale voltages.

The plurality of SRICs 300 may select the DC common voltage VCOMDC supplied from the TPIC 600 and supply the selected DC common voltage VCOMDC to the touch electrodes TE through the touch routing lines TL during the display period DP of the touch synchronization signal TSYNC, thereby enabling the touch electrodes TE to operate as common electrodes.

During the touch period TP of the touch synchronization signal TSYNC, the plurality of SRICs 300 may generate the common voltage modulation signal VCOM_M, which is the touch driving signal, by using the touch driving voltages VCOMH and VCOML supplied from the TPIC 600 and the PWM signal supplied from the MCU 500. During the touch period TP, the plurality of SRICs 300 may level-shift the PWM signal and generate the common voltage modulation signal VCOM_M alternating between the high common voltage VCOMH and the low common voltage VCOML. The plurality of SRICs 300 may select the common voltage modulation signal VCOM_M generated during the touch period TP and supply the selected common voltage modulation signal VCOM_M as the touch driving signal to the touch electrodes TE through the touch routing lines TL. Meanwhile, the SRIC 300 may supply the common voltage modulation signal VCOM_M to the data lines DL during the touch period TP.

The plurality of SRICs 300 may read out signals respectively fed back from the touch electrodes TE, to which the touch synchronization signal is supplied, through the touch routing lines TL during the touch period TP. The SRIC 300 may sense a change in self capacitance of each of the touch electrodes TE, which is caused by a user's touch, from the readout signal, generate touch sensing data through signal processing, and supply the touch sensing data to the MCU 500 during the touch period TP.

Each of the plurality of SRICs 300 may be individually mounted on a circuit film such as a chip on film (COF) 310' and bonded to the panel 100 by a tape automatic bonding (TAB) method, or may be mounted on the panel 100 by a chip on glass (COG) method.

The gate driver 200 may receive the gate control signals from the TCON 400 or the PMIC 700, and generate a gate pulse (scan pulse) according to the gate control signals to sequentially and individually drive the gate lines GL of the corresponding pixel block during the display period DP. The gate driver 200 may supply the gate pulse of a gate-on voltage VON to the corresponding gate line GL for each driving period of the corresponding gate line GL according to the gate control signal during each display period DP, and may supply the gate-off voltage VOFF supplied from the TPIC 600 to the corresponding gate line GL in a non-driving period of the corresponding gate line GL.

The gate driver 200 may supply the gate-off modulation signal VOFF_M supplied from the TPIC 600 to the gate lines GL during each touch period TP.

The gate driver 200 may be formed on a TFT substrate together with a TFT array constituting the pixel matrix of the panel 100, thereby being embedded in a bezel area of the panel 100 in a gate-in-panel (GIP) type. The gate driver 200 of the GIP type may be located at one side portion of the panel 100 or may be located at both side portions of the panel 100. Meanwhile, the gate driver 200 may include a plurality of gate ICs, and may be individually mounted on a circuit film such as a COF and bonded to the panel 100 by a TAB method, or may be mounted on the panel 100 by a COG method.

Referring to FIG. 1, a plurality of COFs 310', on which the plurality of SRICs 300 respectively are mounted, may be disposed between the panel 100 and a printed circuit board (PCB) 800, and may be electrically connected to the panel 100 and the PCB 800. A main printed circuit board (MPCB) 900, on which the PMIC 700, the TPIC 600, the MCU 500, and the TCON 400 are mounted, may be electrically connected to the PCB 800 through a flexible printed circuit (FPC) 810.

The touch display device according to one embodiment may omit input/output pads and transmission lines for transmitting the plurality of touch driving voltages VCOMH and VCOML by transmitting the plurality of touch driving voltages VCOMH and VCOML during the touch period TP using a path, which is used for outputting the reference gamma voltage set from the TPIC 600 to the plurality of SRICs 300 during the display period DP. As a result, the number of input/output pads of the TPIC 600 and the SRIC 300 and the number of transmission lines disposed on the PCB 800 may be reduced, so that manufacturing costs may be reduced and each circuit block may be efficiently controlled.

In the touch display device according to one embodiment, the common voltage modulation block is embedded in the plurality of SRICs 300, so that it is possible to reduce signal distortion of the common voltage modulation signal VCOM_M caused by line resistance as compared to Comparative Example in which the common voltage modulation signal VCOM_M is supplied from the TPIC via the PCB, thereby improving touch sensing capability.

Referring to FIG. 5, during the display period DP of the touch synchronization signal TSYNC, the gate driver 200 may supply the scan pulse of the gate-on voltage VON to the gate lines GL of the corresponding pixel block for sequential driving. The plurality of SRICs 300 may supply a data signal Vdata to the data lines DL, and supply the common voltage VCOMDC to the touch electrodes TE through the touch routing lines TL, thereby charging each of the sub-pixels SP of the corresponding pixel block with a pixel voltage corresponding to the data signal Vdata.

During the touch period TP of the touch synchronization signal TSYNC, the plurality of SRICs 300 may supply the common voltage modulation signal VCOM_M to the touch routing lines TL as the touch driving signal and simultaneously supply the common voltage modulation signal VCOM_M to the data lines DL, and the gate driver 200 may supply the gate-off modulation signal VOFF_M to the gate lines GL. The common voltage modulation signal VCOM_M and the gate-off modulation signal VOFF_M, which are generated by level shifting the PWM signal may have the same phase and amplitude.

As described above, when the common voltage modulation signal VCOM_M, which is the touch driving signal, is applied to the touch electrodes TE during the touch period TP, a modulation signal having the same amplitude and phase as the common voltage modulation signal VCOM_M is applied to the gate lines GL and the data lines DL, so that it is possible to reduce parasitic capacitance between the touch electrode TE and the gate line GL, and between the touch electrode TE and the data line DL in the panel 100. As a result, a resistor capacitor (RC) load of the touch electrodes TE may be reduced so that signal distortion caused by the RC load may be reduced, thereby improving touch sensing sensitivity.

Figure 6:
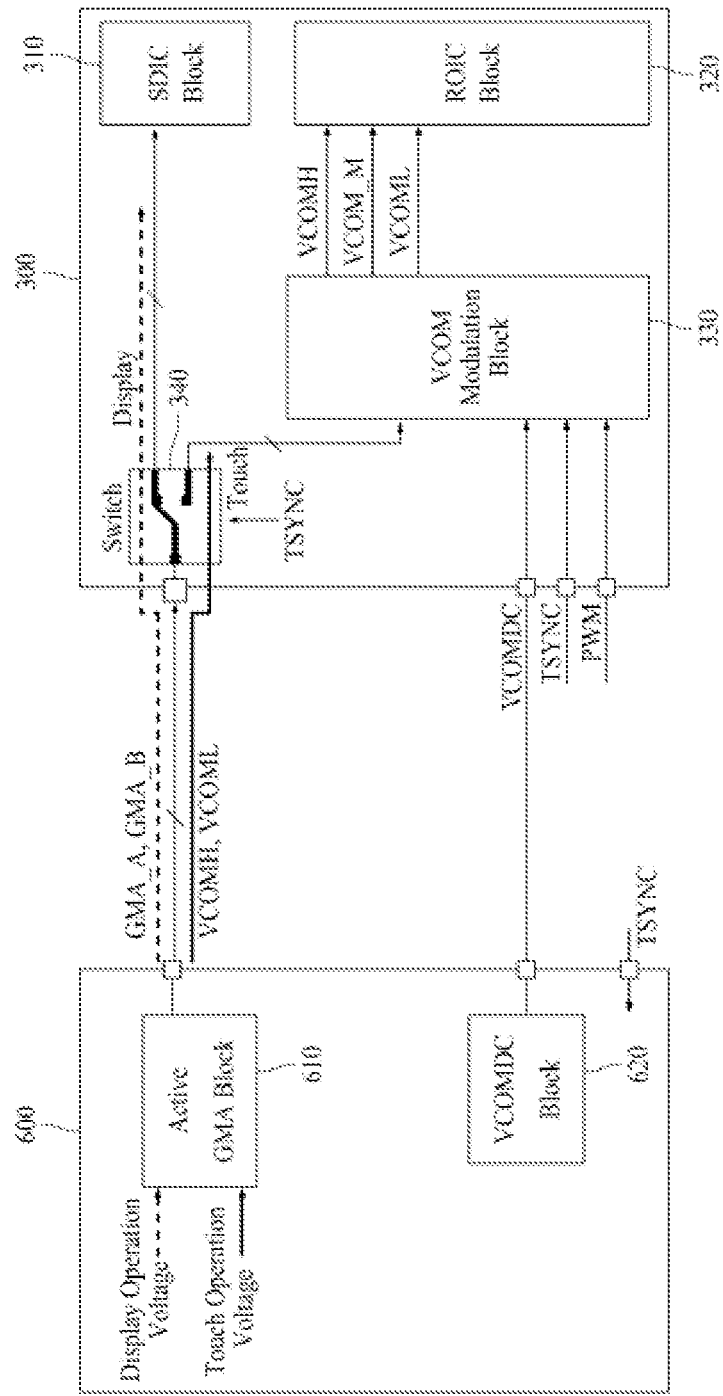
FIG. 6 is a block diagram illustrating a configuration of a touch driver circuit according to one embodiment.
Figure 7:
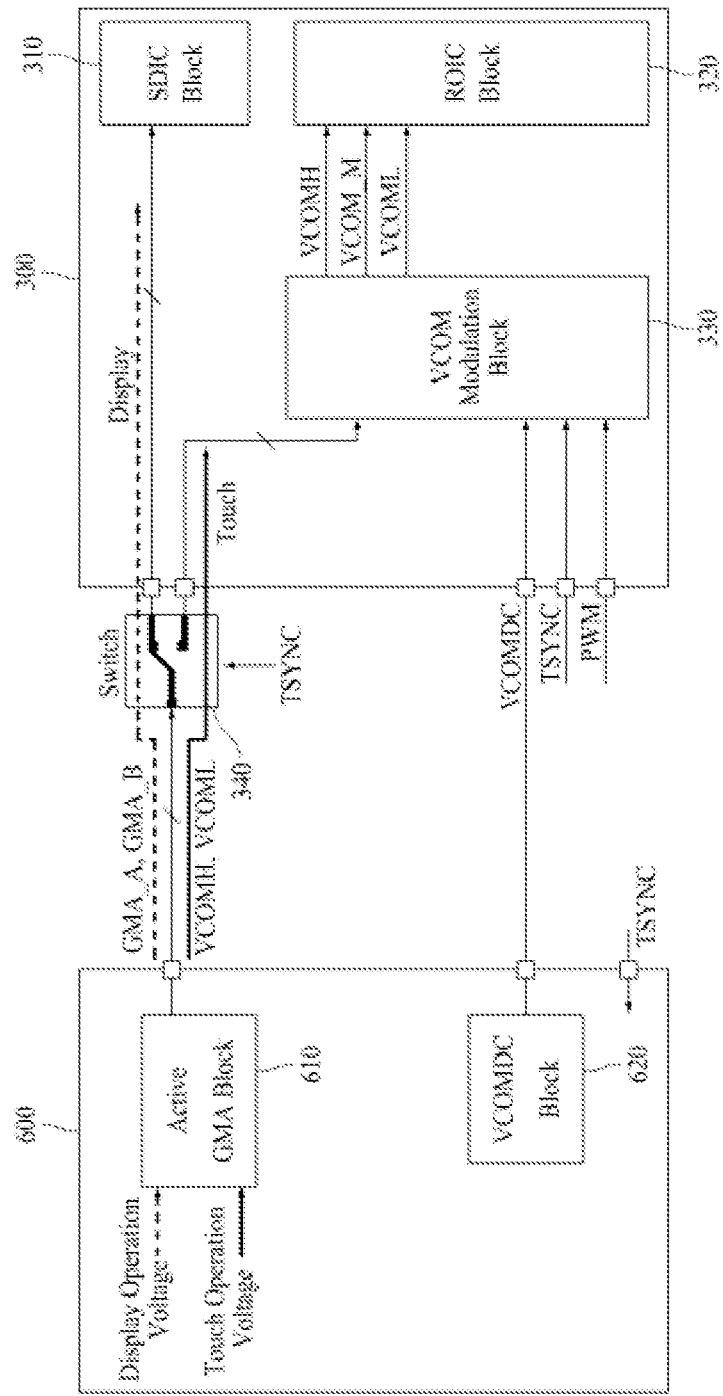
FIG. 7 is a block diagram illustrating a configuration of the touch driver circuit according to one embodiment.
Figure 8:
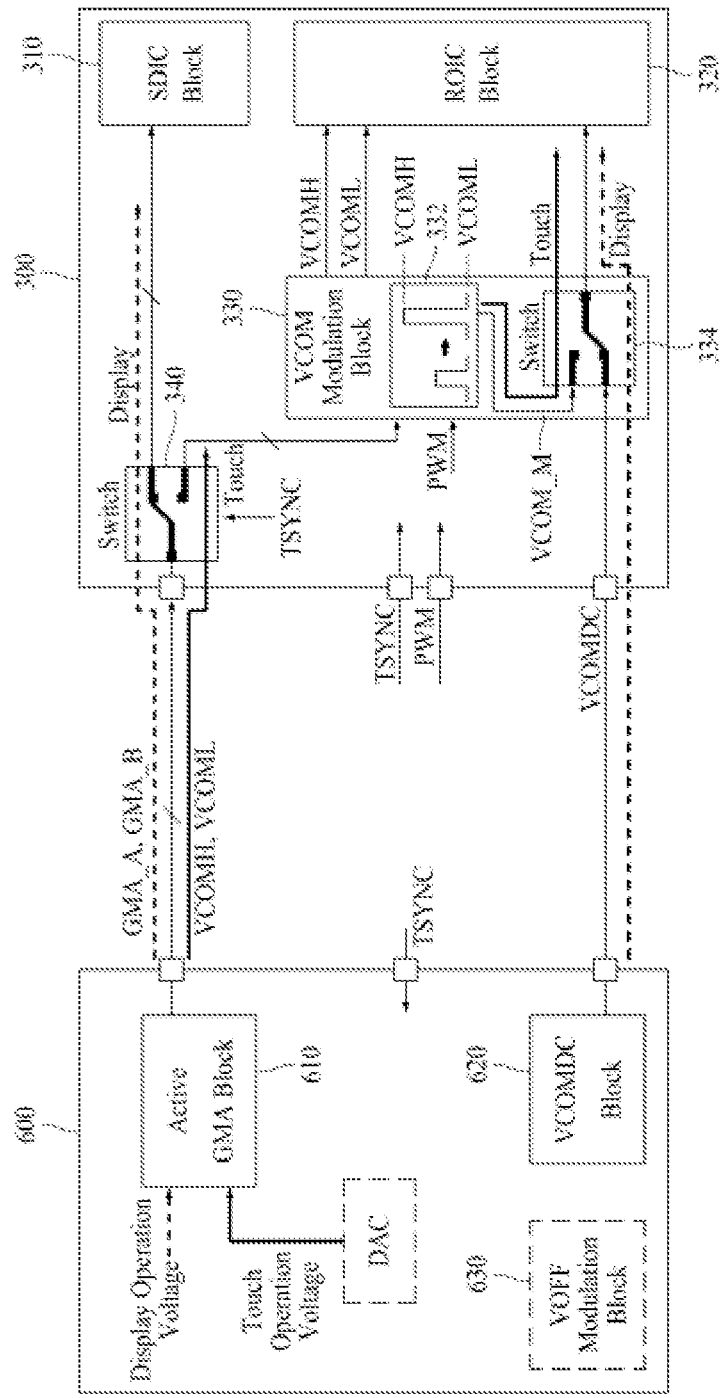
FIG. 8 is a block diagram illustrating a configuration of the touch driver circuit according to one embodiment.
Figure 9:
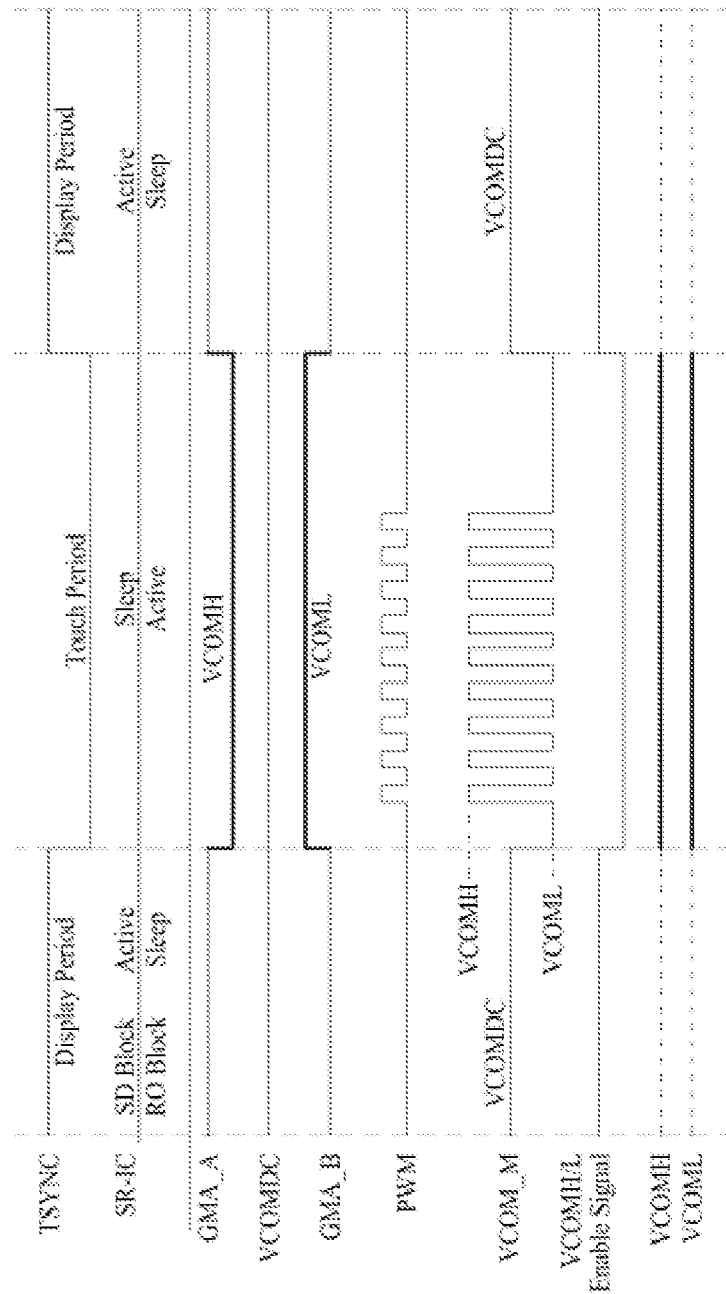
FIG. 9 is a driving waveform diagram of the touch driver circuit according to one embodiment.
Figure 10:
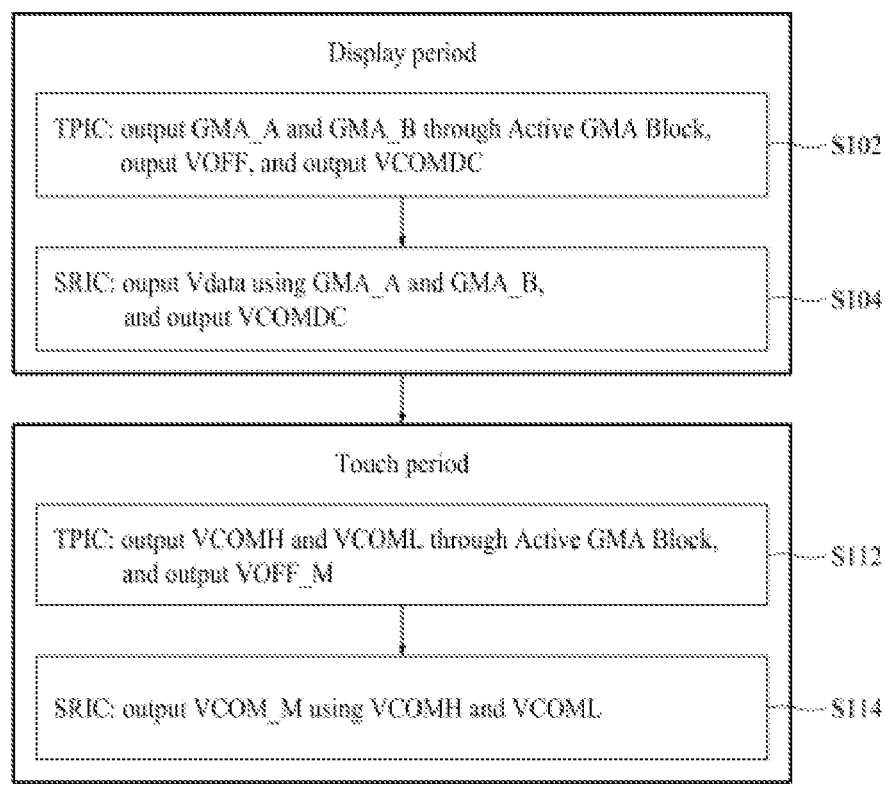
FIG. 10 is a flowchart illustrating a method of driving the touch driver circuit according to one embodiment.

FIGS. 6 to 8 are block diagrams illustrating a configuration of a touch driver circuit according to one embodiment, and FIG. 9 is a driving waveform diagram of the touch driver circuit according to one embodiment, and FIG. 10 is a flowchart illustrating a method of driving the touch driver circuit according to one embodiment.

Hereinafter, a description will be made with reference to FIGS. 6 to 10.

Referring to FIGS. 6 to 8, the touch driver circuit according to one embodiment may include a TPIC 600 and an SRIC 300.

The TPIC 600 may include an active gamma (GMA) voltage generation block 610 configured to generate a reference gamma voltage set GMA_A and GMA_B during a display period of a touch synchronization signal TSYNC and generate a plurality of touch driving voltages VCOMH and VCOML during a touch period, and a common voltage block 620 configured to generate a DC common voltage VCOMDC. On the other hand, the common voltage block 620 configured to generate the DC common voltage VCOMDC may be embedded in the PMIC 700 shown in FIG. 1. The TPIC 600 may further include a gate-off modulation block 630 (FIG. 8) configured to generate a gate-off modulation signal and output the gate-off modulation signal to the gate driver 200.

The active gamma voltage generation block 610 may generate the reference gamma voltage set GMA_A and GMA_B including a plurality of reference gamma voltages having different voltage levels by using a display operation voltage, which is supplied from the PMIC 700, during the display period DP of the touch synchronization signal TSYNC (S102). The active gamma voltage generation block 610 may output the generated reference gamma voltage set GMA_A and GMA_B to the SRIC 300 through a gamma transmission path during the display period DP of the touch synchronization signal TSYNC (S102). The gamma transmission path may include an output buffer of the active gamma voltage generation block 610, an output pad of the TPIC 600, a transmission line of the PCB 800, an input pad of the SRIC 300, and the like.

The active gamma voltage generation block 610 may generate a plurality of touch driving voltages VCOMH and VCOML, i.e., a high common voltage VCOMH and a low common voltage VCOML and output the plurality of touch driving voltages VCOMH and VCOML to the SRIC 300 through the gamma transmission path during the touch period TP of the touch synchronization signal TSYNC (S112).

The active gamma voltage generation block 610 may convert a digital value stored in the internal memory into an analog voltage through a digital-to-analog converter (DAC) to generate the high common voltage VCOMH and the low common voltage VCOML. The active gamma voltage generation block 610 may buffer and output the high common voltage VCOMH and the low common voltage VCOML through two output buffers among a plurality of output buffers respectively outputting the plurality of reference gamma voltages. For example, the active gamma voltage generation block 610 may output the high common voltage VCOMH and the low common voltage VCOML through two output buffers outputting a maximum reference gamma voltage and a minimum reference gamma voltage, respectively.

The common voltage block 620 may generate the DC common voltage VCOMDC and output the DC common voltage VCOMDC to the SRIC 300 (S102).

The gate-off modulation block 630 may select the gate-off voltage VOFF supplied from the PMIC 700 and output the selected gate-off voltage VOFF to the gate driver 200 during the display period DP of the touch synchronization signal TSYNC (S102).

During the touch period TP of the touch synchronization signal TSYNC, the gate-off modulation block 630 may level-shift the PWM signal supplied from the MCU 500 to generate the gate-off modulation signal VOFF_M (see FIG. 5) of an AC waveform alternating between the gate-off high voltage VOFFH (see FIG. 5) and the gate-off low voltage VOFFL (FIG. 5), and select the generated gate-off modulation signal VOFF_M to output the gate-off modulation signal VOFF_M to the gate driver 200 (S112). The gate-off modulation block 630 may convert the digital value stored in the internal memory into the analog voltage to generate the gate-off high voltage VOFFH and the gate-off low voltage VOFFL.

The SRIC 300 may include a source driving circuit (SDIC) block 310 configured to drive the data lines DL, a readout circuit (ROIC) block 320 configured to drive and sense the touch electrodes TE, a common voltage modulation block 330 configured to supply the common voltage VCOMDC, the high common voltage VCOMH, the low common voltage VCOML, and the common voltage modulation signal VCOM_M to the ROIC block 320, and a switching block 340 configured to switch output paths of the touch driving voltages VCOMH and VCOML and the reference gamma voltage set GMA_A and GMA_B.

Meanwhile, as shown in FIG. 7, the switching block 340 may be separated in the form of an IC to be connected between the TPIC 600 and the SRIC 300.

In response to the touch synchronization signal TSYNC, the switching block 340 may output the reference gamma voltage set GMA_A and GMA_B, which is supplied from the TPIC 600 during the display period, to the SDIC block 310 and output the plurality of touch driving voltages VCOMH and VCOML, which are supplied during the touch period, to the ROIC block 320.

The SDIC block 310 may generate a plurality of subdivided grayscale voltages using the reference gamma voltage set, which is supplied from the TPIC 600 through the gamma transmission path and the switching block 340, during the display period DP of the touch synchronization signal TSYNC. The SDIC block 310 may convert the digital image data into an analog data signal Vdata using the subdivided grayscale voltages and supply the analog data signal to the data lines DL of the panel 100 (S104).

The common voltage modulation block 330 may select the common voltage VCOMDC supplied from the TPIC 600 through a switch 334 (see FIG. 8) and output the common voltage VCOMDC to the ROIC block 320 through an output line of the switch 334 during the display period DP of the touch synchronization signal TSYNC. The ROIC block 320 may supply the supplied DC common voltage VCOMDC to the touch electrodes TE through the touch routing lines TL, thereby enabling the touch electrodes TE to operate as common electrodes (S104).

During the touch period TP of the touch synchronization signal TSYNC, the common voltage modulation block 330 may generate the common voltage modulation signal VCOM_M, which is a touch synchronization signal, using the touch driving voltages VCOMH and VCOML, which are supplied from the TPIC 600 through the gamma transmission path and the switching block 340, and the PWM signal supplied from the MCU 500 (S114). During the touch period TP, the common voltage modulation block 330 may generate the common voltage modulation signal VCOM_M alternating between the high common voltage VCOMH and the low common voltage VCOML by level-shifting the PWM signal using a level shifter 332. During the touch period TP, the common voltage modulation block 330 may select the common voltage modulation signal VCOM_M, which is supplied from the level shifter 332, through the switch 334, and output the common voltage modulation signal VCOM_M, which is supplied from the level shifter 332, to the ROIC block 320 through the output line of the switch 334. During the touch period TP, the common voltage modulation block 330 may output the high common voltage VCOMH and the low common voltage VCOML to the ROIC block 320 in response to a VCOMH/L enable signal.

During the touch period TP, the ROIC block 320 may supply the common voltage modulation signal VCOM_M, which is supplied from the common voltage modulation block 330, to the touch electrodes TE through the touch routing lines TL as the touch driving signal (S114). The ROIC block 320 may supply the common voltage modulation signal VCOM_M to the data lines DL during the touch period TP (S114). The ROIC block 320 may read out signals respectively fed back from the touch electrodes TE, to which the touch synchronization signal is supplied, through the touch routing lines TL during the touch period TP, generate touch sensing data by processing the readout signals, and supply the touch sensing data to the MCU 500.

Referring to FIG. 9, it can be seen that, in the SRIC 300, in response to the touch synchronization signal TSYNC, the SDIC block 310 operates in an active mode and the ROIC block 320 operates in a sleep mode during the display period. It can be seen that, in the SRIC 300, in response to the touch synchronization signal TSYNC, the SDIC block 310 operates in the sleep mode and the ROIC block 320 operates in the active mode during the touch period.

As described above, in the touch driver circuit of the touch display device according to one embodiment, the common voltage modulation block 330 is embedded in the SRIC 300, so that it is possible to reduce signal distortion of the common voltage modulation signal VCOM_M caused by line resistance as compared to Comparative Example in which the common voltage modulation signal VCOM_M is supplied from the TPIC via the PCB, thereby improving touch sensing capability.

In the touch display device according to one embodiment, it is possible to omit input/output pads and transmission lines for transmitting the plurality of touch driving voltages VCOMH and VCOML by transmitting the plurality of touch driving voltages VCOMH and VCOML during the touch period using the gamma transmission path, which is used for outputting the reference gamma voltage set from the TPIC 600 to the SRIC 300 during the display period. As a result, the number of input/output pads of the TPIC 600 and the SRIC 300 and the number of transmission lines disposed on the PCB 800 may be reduced, so that manufacturing costs may be reduced and each circuit block may be efficiently controlled.

Figure 11:
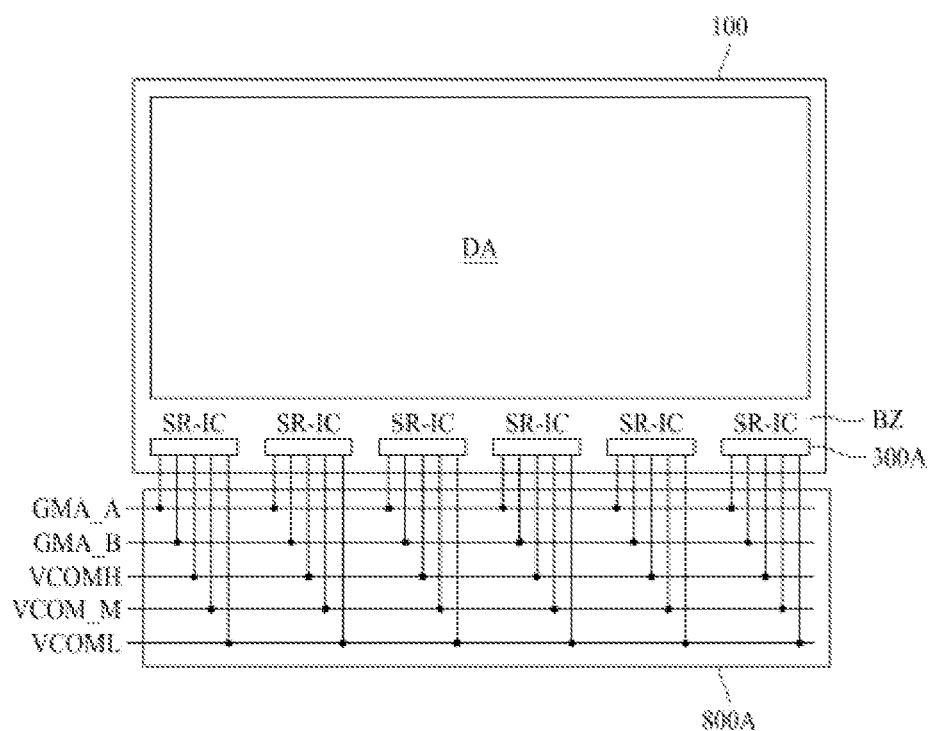
FIGS. 11 and 12 are diagrams illustrating a comparison between the number of lines of a printed circuit board (PCB) of a touch display device according to Comparative Example of related art and the number of lines of a printed circuit board (PCB) of the touch display device according to one embodiment.
Figure 12:
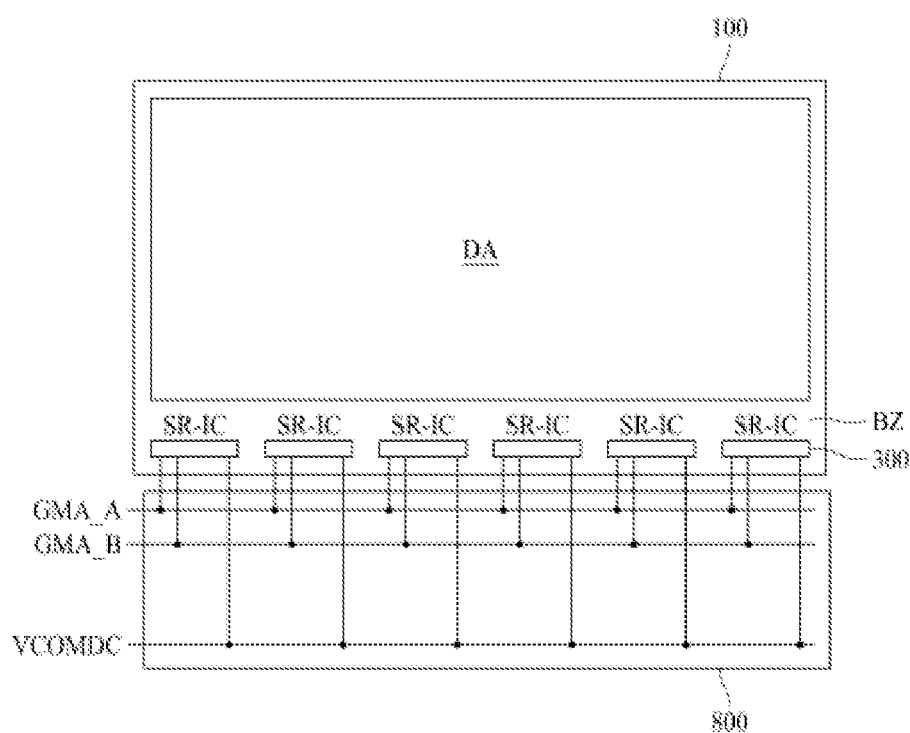

FIGS. 11 and 12 are diagrams illustrating a comparison between the number of lines of the PCB of the touch display device according to Comparative Example and the number of lines of the PCB of the touch display device according to one embodiment.

Referring to FIG. 11, it can be seen that, in a touch display device according to Comparative Example, a plurality of SRICs 300A mounted in a bezel area BZ adjacent to a display area DA of a panel 100 may receive a reference gamma voltage set GMA_A and GMA_B, a high common voltage VCOMH, a low common voltage VCOML, and a common voltage modulation signal VCOM_M from a TPIC through transmission lines passing through a PCB 800A. The lines for transmitting the common voltage modulation signal VCOM_M may supply the common voltage VCOMDC in the display period.

It can be seen that, in the touch display device according to Comparative Example, signal distortion of the common voltage modulation signal VCOM_M may occur due to line resistance of the PCB 800A disposed between the TPIC and the SRICs 300A and the like, and the number of lines of the PCB 800A is relatively large.

Referring to FIG. 12, it can be seen that, in the touch display device according to one embodiment, the common voltage modulation block is embedded in the plurality of SRICs 300 mounted in a bezel area BZ of the panel 100, and thus the PCB 800 disposed between the TPIC and the SRICs 300 may include lines for transmitting the reference gamma voltage set GMA_A and GMA_B and the common voltage VCOMDC, and lines of the high common voltage VCOMH and the low common voltage VCOML may be omitted. Accordingly, it can be seen that the number of lines of the PCB 800 according to one embodiment may be reduced as compared to the number of lines of the PCB 800A according to Comparative Example shown in FIG. 11, thereby reducing manufacturing costs and signal distortion.

As described above, in the touch driver circuit, a method of driving the same, and the driver apparatus of the touch display device according to one embodiment, the common voltage modulation block is embedded in the SRIC to reduce the distortion of the common voltage modulation signal VCOM_M caused by line resistance, thereby improving touch sensing performance.

In the touch driver circuit, a method of driving the same, and the driver apparatus of the touch display device according to one embodiment, the common voltage modulation block is embedded in the SRIC, and receives the high common voltage VCOMH and the low common voltage VCOML from the active gamma voltage generation block embedded in the TPIC through the reference gamma voltage line to generate the common voltage modulation signal VCOM_M, so that the number of pads of the TPIC and the SRIC and the number of lines of the PCB may be reduced, thereby reducing manufacturing costs and efficiently controlling each circuit block.

A touch driver circuit according to one embodiment may include an active gamma voltage generation block configured to generate a reference gamma voltage set and output the reference gamma voltage set through a gamma transmission path during a display period, and generate a touch driving voltage and output the touch driving voltage through the gamma transmission path during a touch period, a switching block configured to output the reference gamma voltage set supplied through the gamma transmission path to a first path during the display period, and output the touch driving voltage supplied through the gamma transmission path to a second path during the touch period, and a common voltage modulation block configured to generate and output a common voltage modulation signal using the touch driving voltage supplied through the switching block and the second path during the touch period.

The touch driver circuit further may include a touch power integrated circuit including the active gamma voltage generation block, and a source-readout integrated circuit including a source driving circuit block configured to receive the reference gamma voltage set supplied through the first path to generate a data voltage during the display period, and a readout circuit block configured to drive and sense touch electrodes. The common voltage modulation block may be embedded in the source-readout integrated circuit and configured to generate the common voltage modulation signal synchronized with a pulse width modulation signal using the touch driving voltage to output the common voltage modulation signal to the readout circuit block during the touch period.

The switching block may be embedded in the source-readout integrated circuit, and the switching block, in response to a touch synchronization signal, may output the reference gamma voltage set supplied through the gamma transmission path to the source driving circuit block through the first path during the display period, and output the touch driving voltage supplied through the gamma transmission path to the common voltage modulation block through the second path during the touch period.

The switching block may be disposed between the touch power integrated circuit and the source-readout integrated circuit, and the switching block, in response to a touch synchronization signal, may supply the reference gamma voltage set supplied through the gamma transmission path to the source driving circuit block of the source-readout integrated circuit through the first path during the display period, and output the touch driving voltage supplied through the gamma transmission path to the common voltage modulation block of the source-readout integrated circuit through the second path during the touch period.

The common voltage modulation block may select a common voltage supplied from the touch power integrated circuit and output the common voltage to the readout circuit block through an output line during the display period of a touch synchronization signal. The readout circuit block may output the common voltage to touch routing lines during the display period of the touch synchronization signal.

The touch driving voltage may include a high common voltage higher than the common voltage and a low common voltage lower than the common voltage. The common voltage modulation block may level-shift the pulse width modulation signal to generate the common voltage modulation signal alternating between the high common voltage and the low common voltage, and select the generated common voltage modulation signal to output the selected common voltage modulation signal to the readout circuit block through the output line during the touch period of the touch synchronization signal.

The readout circuit block may output the common voltage modulation signal to the touch routing lines and data lines during the touch period of the touch synchronization signal.

The touch power integrated circuit may include the active gamma voltage generation block configured to generate the reference gamma voltage set using a display operation voltage during the display period of a touch synchronization signal, and convert a digital value stored in a memory into an analog voltage to generate the touch driving voltage during the touch period of the touch synchronization signal.

The active gamma voltage generation block may output the reference gamma voltage set to an input pad of the source-readout integrated circuit through the gamma transmission path passing through an output buffer, an output pad, and a transmission line during the display period, and output the touch driving voltage to the input pad of the source-readout integrated circuit through the gamma transmission path passing through the output buffer, the output pad, and the transmission line during the touch period.

The touch power integrated circuit further may include a gate-off modulation block configured to select a gate-off voltage and output the gate-off voltage to a gate driver during the display period of the touch synchronization signal, and level-shift the pulse width modulation signal to generate a gate-off modulation signal alternating between a gate-off high voltage higher than the gate-off voltage and a gate-off low voltage lower than the gate-off voltage, and select the generated gate-off modulation signal to output the selected gate-off modulation signal to the gate driver during the touch period of the touch synchronization signal.

A method of driving a touch driver circuit according to one embodiment may include generating a reference gamma voltage set and outputting the reference gamma voltage set through a gamma transmission path by an active gamma voltage generation block of a touch power integrated circuit during a display period of a touch synchronization signal, generating a data voltage using the reference gamma voltage set and outputting the data voltage to a data line by a source-readout integrated circuit during the display period of the touch synchronization signal, generating a touch driving voltage and outputting the touch driving voltage through the gamma transmission path by the active gamma voltage generation block of the touch power integrated circuit during a touch period of the touch synchronization signal, and generating a common voltage modulation signal using the touch driving voltage and outputting the generated common voltage modulation signal to a touch routing line by the source-readout integrated circuit during the touch period of the touch synchronization signal.

The source-readout integrated circuit may select a common voltage supplied from the touch power integrated circuit and output the common voltage to the touch routing line during the display period of the touch synchronization signal.

The touch power integrated circuit may generate the touch driving voltage including a high common voltage higher than a common voltage and a low common voltage lower than the common voltage during the display period of the touch synchronization signal.

The source-readout integrated circuit may level-shift a pulse width modulation signal to generate the common voltage modulation signal alternating between the high common voltage and the low common voltage, and select the generated common voltage modulation signal to output the selected common voltage modulation signal to the touch routing line and the data line during the touch period of the touch synchronization signal.

The touch power integrated circuit may select a gate-off voltage and outputs the gate-off voltage to a gate driver during the display period of the touch synchronization signal, and level-shift a pulse width modulation signal to generate a gate-off modulation signal alternating between a gate-off high voltage higher than the gate-off voltage and a gate-off low voltage lower than the gate-off voltage, and select the generated gate-off modulation signal to output the selected gate-off modulation signal to the gate driver during the touch period of the touch synchronization signal.

A driver apparatus of a touch display device according to one embodiment may include a touch power integrated circuit configured to generate a reference gamma voltage set to output the reference gamma voltage set through a gamma transmission path during a display period of a touch synchronization signal, and generate a touch driving voltage to output the touch driving voltage through the gamma transmission path during a touch period of the touch synchronization signal, and a source-readout integrated circuit configured to output a data voltage using the reference gamma voltage set during the display period, and generate a common voltage modulation signal using the touch driving voltage to output the generated common voltage modulation signal during the touch period.

The source-readout integrated circuit may include a common voltage modulation block configured to generate the common voltage modulation signal synchronized with a pulse width modulation signal using the touch driving voltage during the touch period, a source driving circuit block configured to drive data lines, a readout circuit block configured to drive and sense touch electrodes, and a switching block configured to output the reference gamma voltage set supplied through the gamma transmission path to the source driving circuit block during the display period, and output the touch driving voltage supplied through the gamma transmission path to the common voltage modulation block during the touch period. The touch driving voltage may include a high common voltage higher than a common voltage and a low common voltage lower than the common voltage.

The common voltage modulation block may select the common voltage supplied from the touch power integrated circuit to output the common voltage to the readout circuit block through an output line during the display period, the readout circuit block outputting the common voltage to touch electrodes, and level-shift the pulse width modulation signal to generate the common voltage modulation signal alternating between the high common voltage and the low common voltage and select the generated common voltage modulation signal to output the common voltage modulation signal to the readout circuit block through the output line during the touch period. The readout circuit block may output the common voltage modulation signal to the touch electrodes and the data lines.

The touch power integrated circuit may include an active gamma voltage generation block configured to generate the reference gamma voltage set using a display operation voltage during the display period, and convert a digital value stored in a memory into an analog voltage to generate the touch driving voltage during the touch period of the touch synchronization signal, and a common voltage block configured to generate a common voltage and output the common voltage to the source-readout integrated circuit.

The active gamma voltage generation block may output the reference gamma voltage set to an input pad of the source-readout integrated circuit through the gamma transmission path passing through an output buffer, an output pad, and a transmission line disposed on a printed circuit board during the display period, and output the touch driving voltage to the input pad of the source-readout integrated circuit through the gamma transmission path passing through the output buffer, the output pad, and the transmission line disposed on the printed circuit board during the touch period.

The touch driver circuit and the driver apparatus of the touch display device according to the embodiment may be applied to various electronic devices. For example, the touch driver circuit and the driver apparatus of the touch display device according to the embodiment may be applied to a mobile device, a video phone, a smart watch, a watch phone, a wearable device, a foldable device, a rollable device, a bendable device, a flexible device, a curved device, an electronic notebook, an e-book, a portable multimedia player (PMP), a personal digital assistant (PDA), an MPEG audio layer-3 player, a mobile medical device, a desktop personal computer (PC), a laptop PC, a netbook computer, a workstation, a navigation device, a vehicle navigation device, a vehicle display device, a television, a wallpaper display device, a signage device, a game device, a notebook computer, a monitor, a camera, a camcorder, a home appliance, and the like.

Features, structures, effects, etc. described above in various examples of the present disclosure are included in at least one example of the present disclosure and are not necessarily limited to only one example. Furthermore, features, structures, effects, etc. illustrated in at least one example of the present disclosure may be combined or modified for other examples by those skilled in the art to which the technical idea of the present disclosure pertains. Therefore, the contents related to such combinations and modifications should be interpreted as being included in the technical spirit or scope of the present disclosure.

While the present disclosure described above is not limited to the above-described embodiments and the accompanying drawings, it will be apparent to those skilled in the art to which the present disclosure belongs that various substitutions, modifications, and changes may be made herein without departing from the scope of the present disclosure. Therefore, the scope of the present disclosure is defined by the appended claims, and all changes or modifications derived from the meaning, scope, and equivalence of the claims are to be construed as being included in the scope of the present disclosure.

What is claimed is:

1. A touch driver circuit comprising:
an active gamma voltage generation block configured to generate a reference gamma voltage set and output the reference gamma voltage set through a gamma transmission path during a display period, and generate a touch driving voltage and output the touch driving voltage through the gamma transmission path during a touch period;

a switching block configured to output the reference gamma voltage set supplied through the gamma transmission path to a first path during the display period, and output the touch driving voltage supplied through the gamma transmission path to a second path during the touch period; and a common voltage modulation block configured to generate and output a common voltage modulation signal using the touch driving voltage supplied through the switching block and the second path during the touch period.

2. The touch driver circuit of claim 1, further comprising:
a touch power integrated circuit including the active gamma voltage generation block; and
a source-readout integrated circuit including a source driving circuit block configured to receive the reference gamma voltage set supplied through the first path to generate a data voltage during the display period, and a readout circuit block configured to drive and sense touch electrodes during the touch period,
wherein the common voltage modulation block is embedded in the source-readout integrated circuit and configured to generate the common voltage modulation signal synchronized with a pulse width modulation signal using the touch driving voltage to output the common voltage modulation signal to the readout circuit block during the touch period.

3. The touch driver circuit of claim 2, wherein
the switching block is embedded in the source-readout integrated circuit, and
the switching block, in response to a touch synchronization signal, outputs the reference gamma voltage set supplied through the gamma transmission path to the source driving circuit block through the first path during the display period, and outputs the touch driving voltage supplied through the gamma transmission path to the common voltage modulation block through the second path during the touch period.

4. The touch driver circuit of claim 2, wherein
the switching block is disposed between the touch power integrated circuit and the source-readout integrated circuit, and
the switching block, in response to a touch synchronization signal, supplies the reference gamma voltage set supplied through the gamma transmission path to the source driving circuit block of the source-readout integrated circuit through the first path during the display period, and outputs the touch driving voltage supplied through the gamma transmission path to the common voltage modulation block of the source-readout integrated circuit through the second path during the touch period.

5. The touch driver circuit of claim 2, wherein
the common voltage modulation block selects a common voltage supplied from the touch power integrated circuit and outputs the common voltage to the readout circuit block through an output line during the display period of a touch synchronization signal, and
the readout circuit block outputs the common voltage to touch routing lines during the display period of the touch synchronization signal.

6. The touch driver circuit of claim 5, wherein
the touch driving voltage includes a high common voltage higher than the common voltage and a low common voltage lower than the common voltage, and
the common voltage modulation block level-shifts the pulse width modulation signal to generate the common voltage modulation signal alternating between the high common voltage and the low common voltage, and selects the generated common voltage modulation signal to output the selected common voltage modulation signal to the readout circuit block through the output line during the touch period of the touch synchronization signal.

7. The touch driver circuit of claim 6, wherein the readout circuit block outputs the common voltage modulation signal to the touch routing lines and data lines during the touch period of the touch synchronization signal.

8. The touch driver circuit of claim 2, wherein the touch power integrated circuit includes the active gamma voltage generation block configured to generate the reference gamma voltage set using a display operation voltage during the display period of a touch synchronization signal, and convert a digital value stored in a memory into an analog voltage to generate the touch driving voltage during the touch period of the touch synchronization signal.

9. The touch driver circuit of claim 8, wherein
the active gamma voltage generation block outputs the reference gamma voltage set to an input pad of the source-readout integrated circuit through the gamma transmission path passing through an output buffer, an output pad, and a transmission line during the display period, and
outputs the touch driving voltage to the input pad of the source-readout integrated circuit through the gamma transmission path passing through the output buffer, the output pad, and the transmission line during the touch period.

10. The touch driver circuit of claim 8, wherein the touch power integrated circuit further includes a gate-off modulation block configured to select a gate-off voltage and output the gate-off voltage to a gate driver during the display period of the touch synchronization signal, and level-shift the pulse width modulation signal to generate a gate-off modulation signal alternating between a gate-off high voltage higher than the gate-off voltage and a gate-off low voltage lower than the gate-off voltage, and select the generated gate-off modulation signal to output the selected gate-off modulation signal to the gate driver during the touch period of the touch synchronization signal.

11. A method of driving a touch driver circuit, the method comprising:
generating a reference gamma voltage set and outputting the reference gamma voltage set through a gamma transmission path by an active gamma voltage generation block of a touch power integrated circuit during a display period of a touch synchronization signal;
generating a data voltage using the reference gamma voltage set and outputting the data voltage to a data line by a source-readout integrated circuit during the display period of the touch synchronization signal;
generating a touch driving voltage and outputting the touch driving voltage through the gamma transmission path by the active gamma voltage generation block of the touch power integrated circuit during a touch period of the touch synchronization signal; and
generating a common voltage modulation signal using the touch driving voltage and outputting the generated common voltage modulation signal to a touch routing line by the source-readout integrated circuit during the touch period of the touch synchronization signal.

12. The method of claim 11, wherein the source-readout integrated circuit selects a common voltage supplied from the touch power integrated circuit and outputs the common voltage to the touch routing line during the display period of the touch synchronization signal.

13. The method of claim 11, wherein the touch power integrated circuit generates the touch driving voltage including a high common voltage higher than a common voltage and a low common voltage lower than the common voltage during the display period of the touch synchronization signal.

14. The method of claim 13, wherein the source-readout integrated circuit level-shifts a pulse width modulation signal to generate the common voltage modulation signal alternating between the high common voltage and the low common voltage, and selects the generated common voltage modulation signal to output the selected common voltage modulation signal to the touch routing line and the data line during the touch period of the touch synchronization signal.

15. The method of claim 13, wherein
the touch power integrated circuit selects a gate-off voltage and outputs the gate-off voltage to a gate driver during the display period of the touch synchronization signal, and
level-shifts a pulse width modulation signal to generate a gate-off modulation signal alternating between a gate-off high voltage higher than the gate-off voltage and a gate-off low voltage lower than the gate-off voltage, and selects the generated gate-off modulation signal to output the selected gate-off modulation signal to the gate driver during the touch period of the touch synchronization signal.

16. A driver apparatus of a touch display device, the driver apparatus comprising:
a touch power integrated circuit configured to generate a reference gamma voltage set to output the reference gamma voltage set through a gamma transmission path during a display period of a touch synchronization signal, and generate a touch driving voltage to output the touch driving voltage through the gamma transmission path during a touch period of the touch synchronization signal; and
a source-readout integrated circuit configured to output a data voltage using the reference gamma voltage set during the display period, and generate a common voltage modulation signal using the touch driving voltage to output the generated common voltage modulation signal during the touch period.

17. The driver apparatus of claim 16, wherein
the source-readout integrated circuit includes:
a common voltage modulation block configured to generate the common voltage modulation signal synchronized with a pulse width modulation signal using the touch driving voltage during the touch period;
a source driving circuit block configured to drive data lines;
a readout circuit block configured to drive and sense touch electrodes; and
a switching block configured to output the reference gamma voltage set supplied through the gamma transmission path to the source driving circuit block during the display period, and output the touch driving voltage supplied through the gamma transmission path to the common voltage modulation block during the touch period, and
the touch driving voltage includes a high common voltage higher than a common voltage and a low common voltage lower than the common voltage.

18. The driver apparatus of claim 17, wherein
the common voltage modulation block selects the common voltage supplied from the touch power integrated circuit to output the common voltage to the readout circuit block through an output line during the display period, the readout circuit block outputting the common voltage to touch electrodes, and
level-shifts the pulse width modulation signal to generate the common voltage modulation signal alternating between the high common voltage and the low common voltage and selects the generated common voltage modulation signal to output the common voltage modulation signal to the readout circuit block through the output line during the touch period, and
the readout circuit block outputs the common voltage modulation signal to the touch electrodes and the data lines.

19. The driver apparatus of claim 16, wherein
the touch power integrated circuit includes:
an active gamma voltage generation block configured to generate the reference gamma voltage set using a display operation voltage during the display period, and convert a digital value stored in a memory into an analog voltage to generate the touch driving voltage during the touch period of the touch synchronization signal; and
a common voltage block configured to generate a common voltage and output the common voltage to the source-readout integrated circuit.

20. The driver apparatus of claim 19, wherein
the active gamma voltage generation block outputs the reference gamma voltage set to an input pad of the source-readout integrated circuit through the gamma transmission path passing through an output buffer, an output pad, and a transmission line disposed on a printed circuit board during the display period, and
outputs the touch driving voltage to the input pad of the source-readout integrated circuit through the gamma transmission path passing through the output buffer, the output pad, and the transmission line disposed on the printed circuit board during the touch period.

* * * * *